United States Patent [19]

Fleischauer et al.

[11] 4,198,833
[45] Apr. 22, 1980

[54] CONTROLLED SLIPPAGE, LIMITED TORQUE TRANSMISSION

[75] Inventors: Fred J. Fleischauer, Pittsburgh, Pa.; Theodore L. McCart, Bolton, Canada

[73] Assignee: General Logistics Corporation, Pittsburgh, Pa.

[21] Appl. No.: 700,299

[22] Filed: Jun. 28, 1976

[51] Int. Cl.² .................. F16D 7/02; F16H 55/48; B65G 13/02
[52] U.S. Cl. .................. 64/30 R; 74/230.7; 198/781; 198/789; 74/722
[58] Field of Search .................. 198/781, 789, 790; 64/30 R; 74/230.7

[56] References Cited

U.S. PATENT DOCUMENTS

| | | | |
|---|---|---|---|
| 2,425,785 | 8/1947 | Clark | 74/230.7 |
| 3,650,375 | 3/1972 | Fleischauer et al. | 198/790 |
| 3,696,912 | 10/1972 | Fleischauer et al. | 198/781 |
| 3,840,110 | 10/1974 | Molt et al. | 198/781 |

FOREIGN PATENT DOCUMENTS 1401593  3/1974  United Kingdom .................. 198/790

Primary Examiner—Charles J. Myhre
Assistant Examiner—R. C. Turner
Attorney, Agent, or Firm—Carothers and Carothers

[57] ABSTRACT

A controlled slippage, limited-torque transmission comprises a driving member, a driven member spaced therefrom, and a transmission belt wrapped about the members to transmit torque from the driving member to the driven member. An annular split slippage member is slippingly mounted on one of the driving and driven members and is disposed between that one member and a belt wrap thereabout. The slippage member substantially encircles that one member and is capable of ready assembly and disassembly with respect thereto.

12 Claims, 6 Drawing Figures

CONTROLLED SLIPPAGE, LIMITED TORQUE TRANSMISSION

The present invention relates to limited-torque transmissions, and more particularly to transmissions of the character described having means for effecting a greater degree of control over the slippage thereof.

Although the invention is described primarily in conjunction with accumulation conveyor constructions, it will be evident as this description proceeds that the limited-torque transmission of the invention is of general utility and amenable to a wide range of applications.

A wide variety of limited-torque transmissions have been disclosed heretofore. Although many of these prior transmissions have been more or less successful for their intended specific purposes, these transmissions have been of limited utility owing to problems involving maintenance, replacement of parts, or uncontrolled slippage. In many cases these problems are correlative. For example, uncontrolled slippage or slippage at unpredetermined locations has resulted in undue wearing of transmission belts or the like, which in many machine configurations are difficult or impossible to replace without complete disassembly of the machine.

The preponderance of known limited-torque transmissions have been complex in structure and have required a relatively large number of component parts. Manufacturing and initial installation have therefore been troublesome, in addition to the equally troublesome problems of continuing maintenance and replacement of worn-out parts.

The foregoing and other difficulties associated with prior limited-torque transmissions are overcome by the present invention with the provision of means for more carefully controlling the torque at which the transmission of the invention is designed to slip. Means are also provided for accurately controlling or predetermining which of the various interfaces of the transmission will be primarily subject to slippage. Undesirable slippage at certain interfaces associated with a transmission belt or the like are therefore avoided with the result that the life of the belt is sharply increased and its replacement is drastically postponed or avoided altogether. The limited-torque transmission of the invention is configured such that the vast proportion of wear is confined to a uniquely configured, easily replaced component.

Another unexpected feature of the limited-torque transmission of the invention is a capability of automatic adjustment in the torque limitation. Owing to the unique configuration of the aforementioned component, the level of transmitted torque at which slippage occurs varies according to the loading on the transmission. A particularly advantageous result is realized in application of the limited-torque transmission to accumulation conveyors. It has been found that slippage occurs at lower levels of transmitted torque when the conveyor is handling lighter and usually more fragile articles than in the case of a heavier loading.

Known forms of torque-limiting transmissions, for the most part, waste power. With the present invention, the limited-torque transmission transmits only the actual torque required by a given conveyor roller. During normal load transport, the conveyor rollers are driven positively without slippage by the torque-limiting transmission of the invention. When a given load on the conveyor is accumulated the rollers beneath the load stop. Owing to the preferential slippage characteristic established by the invention, slippage is limited to components of the novel limited-torque transmission which are less subject to wear and which can be readily replaced. Wear of transmission belts and the like is sharply reduced.

In accordance with the invention, the aforementioned advantageous results are obtained by providing a controlled slippage limited-torque transmission comprising a driving member, a driven member spaced therefrom, a transmission belt wrapped about said members to transmit torque from said driving member to said driven member, and an annular split slippage member slippingly mounted on one of said driving and said driven members and disposed between said one member and a belt wrap thereabout, said slippage member substantially encircling said one member, whereby said slippage member is capable of ready assembly and disassembly relative to said one member.

There is also desirably provided a controlled slippage limited-torque transmission comprising an elongated drive member, a number of elongated driven members spaced therefrom in a generally parallel array disposed normal to said drive shaft, a like number of transmission belts looped about said drive shaft and individually about said driven members, an annular split slippage member for each of said belts slippingly mounted on one of said drive member and an associated one of said driven members, said belts being wrapped about said slippage members respectively, each of said slippage members substantially encircling said one member whereby each of said slippage members is capable of ready assembly and disassembly with respect to said one member.

There is also desirably provided a similar controlled slippage limited-torque transmission wherein each of said slippage members is further configured with a gapped split when so mounted, whereby the slippage members are tightened by the belt wraps thereabout respectively.

The following U.S. Patents are noted:

| | Inventor | Patent No. |
| --- | --- | --- |
| | Fleischauer & Hammond | 3,650,375 |
| | Fromme et al | 3,753,485 |
| | Molt et al | 3,840,110 |
| | Bangerter et al | 3,457,733 |
| and | Lundh (Swedish) | 152,470 |

The foregoing patents, however, do not disclose the novel features set forth above and described below in greater detail.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings there are illustrated certain presently preferred embodiments of the invention together with certain presently preferred methods of practicing the same wherein.

Figure 1:
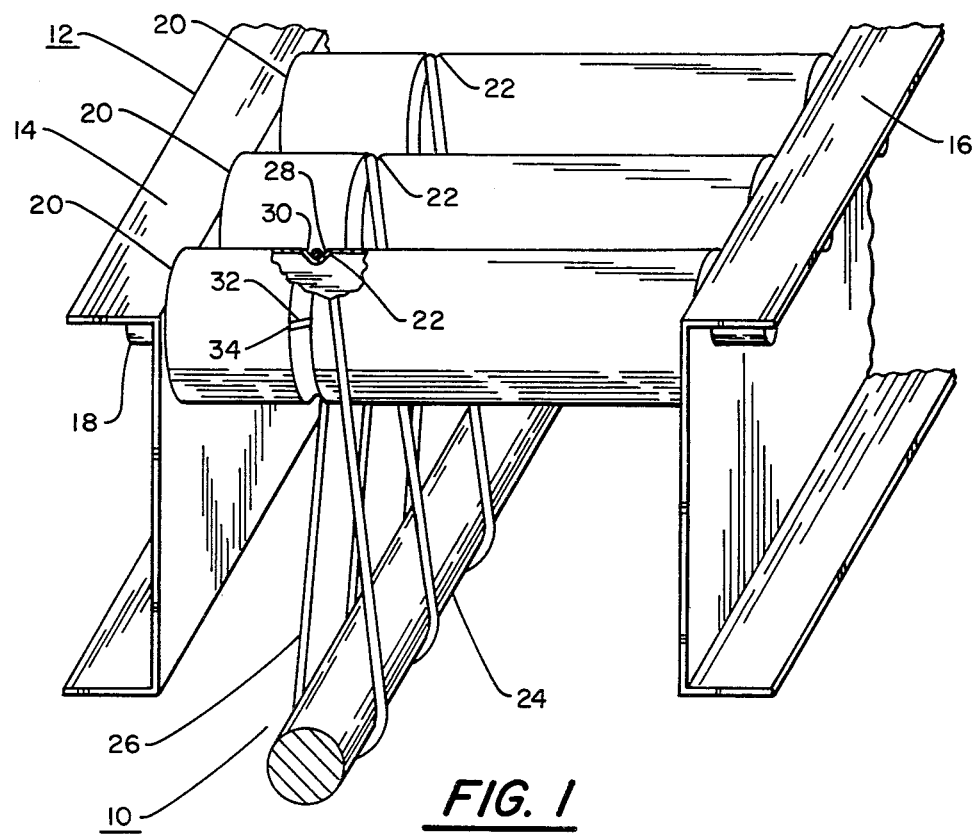
FIG. 1 is a schematic isometric view of one form of the controlled slippage limited-torque transmission of the invention associated in this example with an accumulation conveyor.
Figure 2:
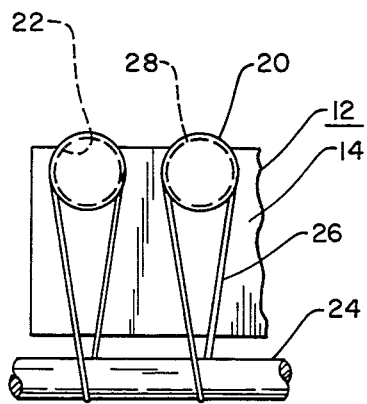
FIG. 2 is a side elevational view of the apparatus shown in FIG. 1.

With reference now more particularly to FIGS. 1 and 2 of the drawings, the novel torque-limiting transmission 10 of the invention is illustrated in conjunction with a minimum pressure accumulation conveyor denoted generally by the reference numeral 12. In the disclosed arrangement, a pair of conveyor rails 14, 16 conventionally support an array of roller axles 18. A like number of conveyor rollers 20 are individually and rotatably mounted upon the axles 18. The conveyor rollers 20 are of conventional construction, save that each of the rollers is provided with a grooved configuration 22 adjacent one end thereof.

In this arrangement of the invention the limited-torque transmission is configured as a right-angled drive, and therefore, includes a line shaft 24 passing beneath the array of conveyor rollers 20 substantially at right angles thereto and positioned more or less directly below the roller grooves 22. The line shaft 24 can be rotated by a conventional electric motor drive or other motive means (not shown). Suitable and conventional brackets (not shown) are also provided for rotatably supporting the line shaft 24 beneath the conveyor rollers 20 and generally parallel to the adjacent conveyor rail 14. The aforementioned line shaft supporting brackets can be extended in a conventional manner from the conveyor rail 14.

An elastomeric transmission belt 26 is seated at each of the grooves 22 by means of a grooved split ring 28 described in greater detail below. The transmission belts 26, which can take the form of O-rings fabricated for a suitable elastomeric material such as polyurethane, are wrapped about the common drive shaft or line shaft 24. Where "walking" of the transmission belts 26 is axially along shaft 24 is a problem, individual grooves (similar to that shown in FIG. 4 at 38) can be provided directly on the line shaft 24 for guidance of the transmission belts 26.

In the conveyor construction 12 including the limited-torque transmission 10, as thus far described, it will be apparent that slippage can occur at one of four locations in transmission of torque from the line shaft 24 to a load (not shown) on the conveyor rollers 20. These locations are the interfaces between the transmission belt 26 and its wrap about the line shaft, and at its wrap about split ring 28 respectively, between the split ring 28 and the conveyor roller 20, and between the conveyor roller and the load (not shown) thereon. If slippage occurs at either of the O-ring interfaces undue wearing occurs resulting eventually either in breakage or loss of adequate torque transmission. This problem is aggravated by the obvious fact that one or more of the transmission belts 26 cannot be replaced without a virtually complete disassembly of the conveyor construction 12. On the other hand if slippage occurs between the roller 20 and the load thereon damage to the load or unusual roller wear can occur. In any event a wasteful power consumption is encountered owing largely to an uncontrolled or unpredetermined torque slippage limitation.

These largely uncontrolled slippages are obviated unexpectedly by the present invention through the use of the aforementioned slippage ring 28 inserted into each of the roller grooves 28 so as to lie between the wrap of the associated transmission belt 26 and the grooved portion 22 of the associated roller 20. In the arrangement of the invention as illustrated in FIGS. 1 and 2 each of the slippage rings 28 is configured so as to seat initially flushly within the respectively associated roller groove 22. The slippage rings 28 are fabricated from an elastic material which has rigidity such as acetal resin exhibiting a relatively low coefficient of friction with respect to the roller material (usually sheet steel). On the other hand, the outer surface of each of the slippage rings 28 can be coated with a layer 30 of a material such as polyurethane exhibiting a higher coefficient of friction at the interface between the transmission belt 26 and the slippage ring 28. Alternatively or in conjunction therewith the outer surface of each of the slippage rings 28 can be knurled or otherwise distressed to induce a higher coefficient of friction. Where polyurethane is employed for the transmission belt material and/or for the layer 30, the durometer can be preselected to yield in conjunction with other factors such as respective radii of the belt wraps and inner surface of the slippage member 28 and the forces exerted by the belt wraps, a predetermined coefficient of friction.

With the conveyor construction 12 as described thus far, it will be apparent that slippage of the limited torque transmission 10 will preselectedly occur at the interface between the slippage rings 28 and their respectively associated rollers 20. In consequence the problems mentioned previously in connection with the other three interfaces of the transmission 10 are obviated.

Figure 2A:
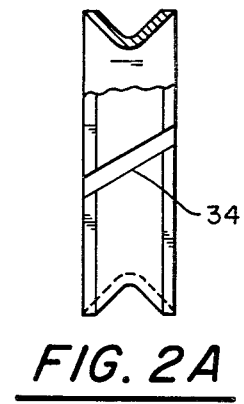
FIG. 2A is an enlarged, partial, elevational view of one of the annular split slippage members shown in FIG. 1.

A controlled slippage and attendantly preferential wearing of the transmission 10 at the interface between the slippage rings 28 and rollers 20 engenders a further unexpected result, according to another feature of the invention. Desirably each of the slippage rings 28 is split at 32 as shown in FIGS. 1 and 2A. The split 32 facilitates initial assembly of each of the slippage rings 28 into the associated roller groove 22. More importantly, any given one of the slippage rings 22 can be readily removed from its associated roller 20 without cutting and possible defacement of the surface of the roller groove 22. Most importantly, an elastic replacement slippage ring having rigidity need merely be snapped about the roller groove 22 without the necessity of removing the roller or otherwise disassembling the conveyor construction 12.

Desirably each of the slippage rings 28 is provided with an inner diameter smaller than the outer diameter of the associated groove 22 such that when the ring is snapped in place in the roller groove a gap 34 (FIG. 2A) exists between the ends of the split ring 28. The provision of the gap 34 permits each slippage ring 28 to function for a considerable period until the inevitable wearing so increases the inner diameter of the slippage ring that the gap 34 is closed by the contracting stress forces of the ring. Until this occurs, the characters of the interference fit between the slippage rings 28 and the conveyor rollers 20 remains relatively constant and thus produces a constant level of transmitted torque at which slippage occurs in the transmission 10. Of course, when the gap 34 eventually closes owing to wearing of the slippage ring 28, this relationship no longer holds. However, the conveyor will continue to operate and to transmit torque, even after the wear has been sufficient to allow the gap to close. There is no possibility that either belt slippage or load slippage will occur in preference to the predetermined slippage at the ring 28—roller 20 interface.

Owing to the extremely low coefficients of friction associated with certain plastic materials, such as those identified as acetal resins from which the slippage rings 28 may be fabricated, the provision of the gap 34 provides the additional advantage that substantially the entire inner surface of each of the slippage rings 28 is in flush engagement with the associated roller groove 22. This increases the level of transmitted torque of which the transmission 10 is capable of transmitting since greater belt loadings may be applied without exceeding the maximum allowable product of pressure and velocity (PV rating) which the material can withstand. This is so because a greater contact area results in reduced load per unit area pressure.

Figure 2B:
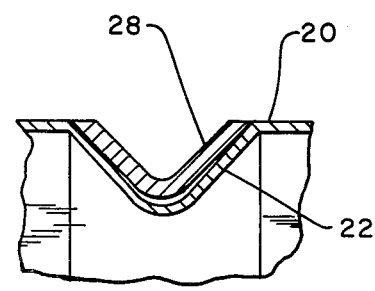
FIG. 2B is an enlarged, longitudinally sectioned, partial view of a modified form of the limited-torque transmission of the invention.

In certain applications where a higher level of transmitted torque is necessary the interference fit between the slippage rings and the roller grooves can be further enhanced for example by usage of the interference fit illustrated in FIG. 2B. In this feature of the invention, slippage ring 28' is provided initially with a slightly shallower configuration than that of the roller groove 22' (both of which are generally V-shaped, in this example). With this arrangement when a transmission belt 26 (not shown in FIG. 2B) is seated on the slippage ring 28' the resultant pressure of its tensional wrapping about the roller 20' and the line shaft 24 (FIG. 1) causes the slippage ring 29' to seat flushly into the roller groove 22' with a wedging action. Such wedging action increases the overall coefficient of friction exhibited by the ensuing interference fit.

Figure 3:
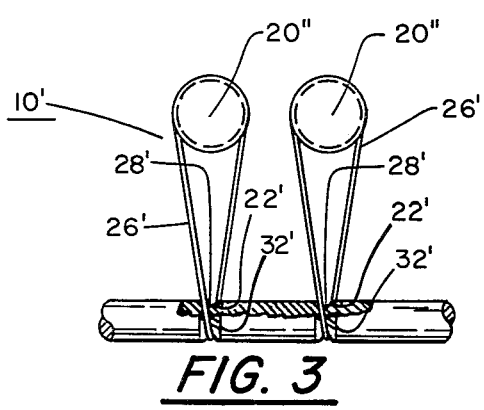
FIG. 3 is an elevational view of another modification of the invention.

As better shown in FIG. 3, it is also contemplated that the split rings can be mounted on the driving member or line shaft 24' rather than individually on the driven members or rollers 20'. In the latter arrangement of the invention a series of slippage rings 28 or 28' are mounted in a series of grooves 22' spaced along the length of the drive shaft 24'. Desirably the slippage rings 28' likewise are provided with gapped splits 32' for the purpose mentioned previously.

Figure 4:
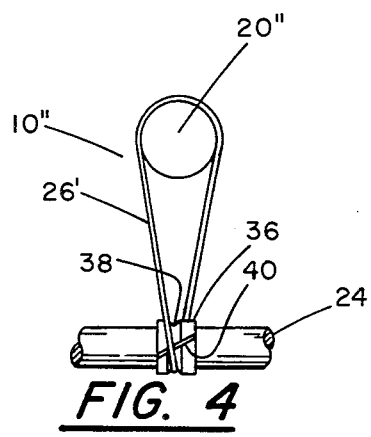
FIG. 4 is a similar view of still another modification of the invention.

Another modification of the limited-torque transmission is illustrated in FIG. 4, where neither the rollers 20" nor the line shaft 24 is grooved. A slippage member 36 is provided for each of the rollers 20", but is configured as a sleeve slideably mounted upon the line shaft 24 and disposed more or less directly beneath the associated conveyor roller 20". Desirably each sleeve 36 is provided with a central groove 38 for guidance of the associated belt wrap thereabout. Desirably also the slippage sleeve 36 is provided with a gapped split 40 for the purposes described heretofore. Stops (not shown) can be provided to limit "walking" of the split sleeves 36, although this is not essential owing to the continuity of the line shaft 24. The related components of the limited-torque transmission 10" can be reversed such that the split sleeve 36 is mounted on the roller 20", instead. In either case the provision of the split sleeve 36 accomplishes the unexpected results and advantageous operation described previously.

In addition to affording a reliable limited-torque transmission the various modifications of the invention concentrate the ponderance of wear in the transmission at an easily replaced component. The presence of the gapped split 32, 32' or 40 affords a reliable and repeatable level of controlled torque transmission throughout the useful life of the slippage member 28, 28' or 36.

From the foregoing it will be seen that a novel and efficient arrangement for Controlled Slippage Limited-Torque Transmission has been disclosed and described. The descriptive and illustrative materials employed herein are utilized for purposes of exemplifying the invention and not in limitation thereof. Accordingly, numerous modifications of the invention will occur to those skilled in the art without departing from the spirit and scope of the invention. It is to be understood that certain features of the invention can be used to advantage without a corresponding use of other features thereof.

I claim:

1. A controlled slippage limited-torque transmission comprising a driving member, a driven member spaced therefrom, a transmission belt wrapped about said members to transmit torque from said driving member to said driven member, and an elastic annular split slippage member having rigidity and a gap at the split slippingly mounted on one of said driving and said driven members and disposed between said one member and a belt wrap thereabout, said slippage member substantially encircling said one member, whereby said slippage member is capable of ready assembly and disassembly relative to said one member.

2. The combination according to claim 1 wherein said slippage member is configured to fit substantially in a groove formed in said one member.

3. A controlled slippage limited-torque transmission comprising a driving member, a driven member spaced therefrom, a transmission belt wrapped about said members to transmit torque from said driving member to said driven member, and an elastic annular split slippage member having rigidity and slippingly mounted on one of said driving and said driven members and disposed between said one member and a belt wrap thereabout, said slippage member substantially encircling said one member, whereby said slippage member is capable of ready assembly and disassembly relative to said one member, said slippage member configured with an inner diameter smaller than an outer diameter of the adjacent portion of said one member such that said split is gapped throughout the useful life of said slippage member and said slippage member is under contracting stress forces from its elastic characteristics about said one member.

4. The combination according to claim 2 wherein said slippage member is provided with a groove receiving said belt wrap and is fitted flushly in said one member groove.

5. A controlled slippage limited-torque transmission comprising a driving member, a driven member spaced therefrom, a transmission belt wrapped about said members to transmit torque from said driving member to said driven member, and an elastic annular split slippage member having rigidity and slippingly mounted on one of said driving and said driven members and disposed between said one member and a belt wrap thereabout, said slippage member substantially encircling said one member, whereby said slippage member is capable of ready assembly and disassembly relative to said one member, said slippage member configured to fit substantially in a groove formed in said one member, said slippage member provided with a groove receiving said belt wrap, said slippage member being of shallower configuration than that of said groove such that the pressure of said belt wrap seats and slippage member flushly into said groove with a wedging action.

6. The combination according to claim 1 wherein said slippage member is provided with a negative clearance with respect to the adjacent portion of said one member.

7. A controlled slippage limited-torque transmission comprising an elongated drive member, a number of elongated driven members spaced therefrom in a generally parallel array disposed normal to said drive member, a like number of transmission belts looped about said drive member and individually about said driven members, an elastic annular split slippage member having rigidity and gapped at the split for each of said belts slippingly mounted on at least one of said drive member or an associated one of said driven members, said belts being wrapped about said slippage members respectively, each of said slippage members substantially encircling said one member whereby each of said slippage members is capable of ready assembly and disassembly with respect to said one member.

8. The combination according to claim 7 wherein each of said slippage members is mounted in a closely fitting groove therefor formed in said one member.

9. The combination according to claim 7 wherein said slippage members are mounted respectively on said driven members.

10. The combination according to claim 7 wherein said slippage members are mounted on said drive member and are spaced therealong.

11. The combination according to claim 7 wherein each of said slippage members is further configured with a gapped split when so mounted and the slippage members are under contracting stress forces from its elastic characteristics thereabout respectively.

12. A controlled slippage limited-torque transmission comprising an elongated drive member, a number of elongated driven members spaced therefrom in a generally parallel array disposed normal to said drive member, a like number of transmission belts looped about said drive member and individually about said driven members, an annular split slippage member for each of said belts slippingly mounted on at least one of said drive members or an associated one of said driven members, said belts being wrapped about said slippage members respectively, each of said slippage members substantially encircling said one member whereby each of said slippage members is capable of ready assembly and disassembly with respect to said one member, each of said slippage members being further configured with a gapped split when so mounted, whereby the slippage members are tightened by the belt wraps thereabout respectively.

* * * * *